(12) United States Patent
Liu et al.

(10) Patent No.: US 12,349,058 B2
(45) Date of Patent: Jul. 1, 2025

(54) METHOD OF ESTABLISHING WIRELESS COMMUNICATION NETWORK, NETWORK DEVICE AND USER EQUIPMENT

(71) Applicant: BEIJING UNIVERSITY OF POSTS AND TELECOMMUNICATIONS, Beijing (CN)

(72) Inventors: Xiqing Liu, Beijing (CN); Mugen Peng, Beijing (CN); Yuwei Liao, Beijing (CN); Dixiang Gao, Beijing (CN); Hao Wei, Beijing (CN); Shi Yan, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 425 days.

(21) Appl. No.: 17/989,786

(22) Filed: Nov. 18, 2022

(65) Prior Publication Data
US 2024/0179621 A1    May 30, 2024

(51) Int. Cl.
*H04W 48/20* (2009.01)
*H04W 24/10* (2009.01)
*H04W 76/10* (2018.01)

(52) U.S. Cl.
CPC .......... *H04W 48/20* (2013.01); *H04W 24/10* (2013.01); *H04W 76/10* (2018.02)

(58) Field of Classification Search
CPC ...... H04W 48/20; H04W 76/10; H04W 24/10
See application file for complete search history.

(56) References Cited

U.S. PATENT DOCUMENTS

| | | | |
|---|---|---|---|
| 2016/0135063 A1* | 5/2016 | Ham | H04W 76/19 370/328 |
| 2016/0143035 A1* | 5/2016 | Xue | H04L 5/001 370/329 |
| 2023/0397173 A1* | 12/2023 | Qiao | H04L 5/0053 |

* cited by examiner

*Primary Examiner* — Hermon Asres
(74) *Attorney, Agent, or Firm* — REISING ETHINGTON, P.C.

(57) ABSTRACT

In a network comprising a plurality of macro base stations, a plurality of micro base stations and a plurality of user devices (UEs), a method of establishing a wireless communication network includes: assigning the micro base stations into a plurality of clusters and selecting a micro base station from each of the clusters as a cluster head; receiving, from cluster heads of the clusters by the network device, information about candidate sub-clusters determined by UEs, each of the candidate sub-clusters comprises micro base stations whose signal power received at a UE exceeds a pre-defined threshold; identifying at least two schemes of grouping the micro base stations into non-overlapping sub-clusters based on the candidate sub-clusters; for a scheme of the at least two schemes, making each of the UEs select to access a macro base station or to be associated with one of the non-overlapping sub-clusters of the scheme base on respective measurements of signals received from at least one of a macro base station and a sub-cluster of the non-overlapping sub-clusters of the scheme; suppressing, by a UE, inter-symbol interference by subtracting a tail of a first symbol from a second symbol before recovering the second symbol; suppressing, by the UE, inter-carrier interference by adding a tail estimated of the second symbol to the second symbol before recovering the second symbol; acquiring information about power consumption of each of the macro base stations and power consumption of each of the micro base stations in communications with the UEs which performs inter-symbol interference suppression and inter-car- (Continued)

rier interference suppression at the UEs; and making the micro base stations perform joint transmissions in sub-clusters as specified in a scheme selected from the at least two schemes according to the information about power consumption.

20 Claims, 5 Drawing Sheets

METHOD OF ESTABLISHING WIRELESS COMMUNICATION NETWORK, NETWORK DEVICE AND USER EQUIPMENT

FIELD OF THE TECHNOLOGY

The present application relates to wireless communications, and particularly, to a method of establishing a wireless communication network, network device and user equipment (UE).

BACKGROUND

With the accelerated deployment and maturity of the fifth-generation mobile communication system (5G), the continuous increase in the number of network accessing devices and base stations (BS) has not only brought a big wave of data traffic, but also led to a substantial increase in the overall energy consumption and carbon emissions by the network. As such, high energy efficiency is regarded as one of important factors in the design of the next-generation network architectures.

SUMMARY

Various embodiments provide a method of establishing a wireless communication network. The method includes: in a network comprising a plurality of macro base stations, a plurality of micro base stations and a plurality of user devices (UEs); assigning, by a network device, the micro base stations into a plurality of clusters and selecting a micro base station from each of the clusters as a cluster head; receiving, from cluster heads of the clusters by the network device, information about candidate sub-clusters determined by UEs, each of the candidate sub-clusters comprises micro base stations whose signal power received at a UE exceeds a pre-defined threshold; identifying, by the network device, at least two schemes of grouping the micro base stations into non-overlapping sub-clusters based on the candidate sub-clusters, each micro base station belongs to not more than one of the non-overlapping sub-clusters in each of the at least two schemes; for a scheme of the at least two schemes, making, by the network device, each of the UEs select to access a macro base station or to be associated with one of the non-overlapping sub-clusters of the scheme base on respective measurements of signals received from at least one of a macro base station and a sub-cluster of the non-overlapping sub-clusters of the scheme; suppressing, by a UE, inter-symbol interference by subtracting a tail of a first symbol from a second symbol before recovering the second symbol, the first symbol is received from a sub-cluster performing joint transmission, the second symbol is received following the first symbol from the sub-cluster; suppressing, by the UE, inter-carrier interference by adding a tail estimated of the second symbol to the second symbol before recovering the second symbol; acquiring, by the network device, information about power consumption of each of the macro base stations and power consumption of each of the micro base stations in communications with the UEs which performs inter-symbol interference suppression and inter-carrier interference suppression at the UEs; and making, by the network device, the micro base stations perform joint transmissions in sub-clusters as specified in a scheme selected from the at least two schemes according to the information about power consumption.

Various embodiments provide a network device in a network comprising a plurality of macro base stations, a plurality of micro base stations and a plurality of user devices (UEs). The network device includes: a processor; and a memory storing machine-readable instructions executable by the processor to: assign the micro base stations into a plurality of clusters and selecting a micro base station from each of the clusters as a cluster head; receive, from cluster heads of the clusters, information about candidate sub-clusters determined by UEs, each of the candidate sub-clusters comprises micro base stations whose signal power received at a UE exceeds a pre-defined threshold; identify at least two schemes of grouping micro base stations into non-overlapping sub-clusters based on the candidate sub-clusters, each micro base station belongs to not more than one of the non-overlapping sub-clusters in each of the at least two schemes; for a scheme of the at least two schemes, make each of the UEs select to access a macro base station or to be associated with one of the non-overlapping sub-clusters of the scheme base on respective measurements of signals received from at least one of a macro base station and at least one sub-cluster of the non-overlapping sub-clusters of the scheme; acquire information about power consumption of each of the macro base stations and power consumption of each of the micro base stations in communications with the UEs which performs inter-symbol interference suppression and inter-carrier interference suppression at the UEs; make the micro base stations perform joint transmissions in sub-clusters as specified in a scheme selected from the at least two schemes according to the information about power consumption.

Various embodiments provide a user device (UE) in a network comprising a plurality of macro base stations, a plurality of micro base stations and a plurality of user devices. The UE includes: a processor; and a memory storing machine-readable instructions executable by the processor to: obtain first measurements of signals received from at least one of a macro base station and at least one micro base station; determine, using the first measurements, a candidate sub-cluster which comprises micro base stations whose signal power received by the UE exceeds a pre-defined threshold; sending information about the candidate sub-cluster to a serving base station; obtaining second measurements of signals received from at least one of a macro base station and at least one sub-cluster; selecting, using the second measurements, to access a macro base station or to be associated a sub-cluster; suppressing inter-symbol interference of joint transmission of a sub-cluster by subtracting a tail of a first symbol of the joint transmission from a second symbol received following the first symbol before recovering the second symbol; suppressing inter-carrier interference by adding a tail estimated of the second symbol to the second symbol before recovering the second symbol.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Reviewing previous network architecture designs, the classic cellular network architecture consists of multiple hexagonal cells, and can realize frequency multiplexing and solve the problem of limited frequency resources. At cell edges, however, there are issues such as user access selection and interferences from multiple BSs. To address the issues, the network architecture referred to as coordinated multipoint transmission (CoMP) was proposed, in which multiple BSs from the same cluster cooperate to provide services for users. CoMP can effectively avoid the user access selection issue at cell edges, but there are still severe interferences at cluster edges. The Cell-Free (CF) network architecture goes further than CoMP by interconnecting all of BSs for cooperation. As such, the best access selection can be made through information exchange between the BSs, and the interferences at cluster edges can be minimized. Nonetheless, the CF network architecture lacks scalability, and suffers from the high signaling overhead and long delay. There is the need of a new eco-friendly and energy-efficient architecture for the next-generation wireless network, to effectively solve the contradiction between the high energy consumption and users' demand for high-quality services. The network architecture based on cooperation of multiple BSs is an effective approach to improve system capacity. However, the increased overall network energy consumption due to the signaling overhead for BSs cooperation is seldom taken into consideration. At the same time, during a coordinated transmission, signals received by a user device (also referred to as user equipment, UE) are not in ideal synchronization since the time of arrival of the signals from different BSs are influenced by the differences in transmission distance. The interference caused by the asynchrony is also less concerned.

Figure 1:
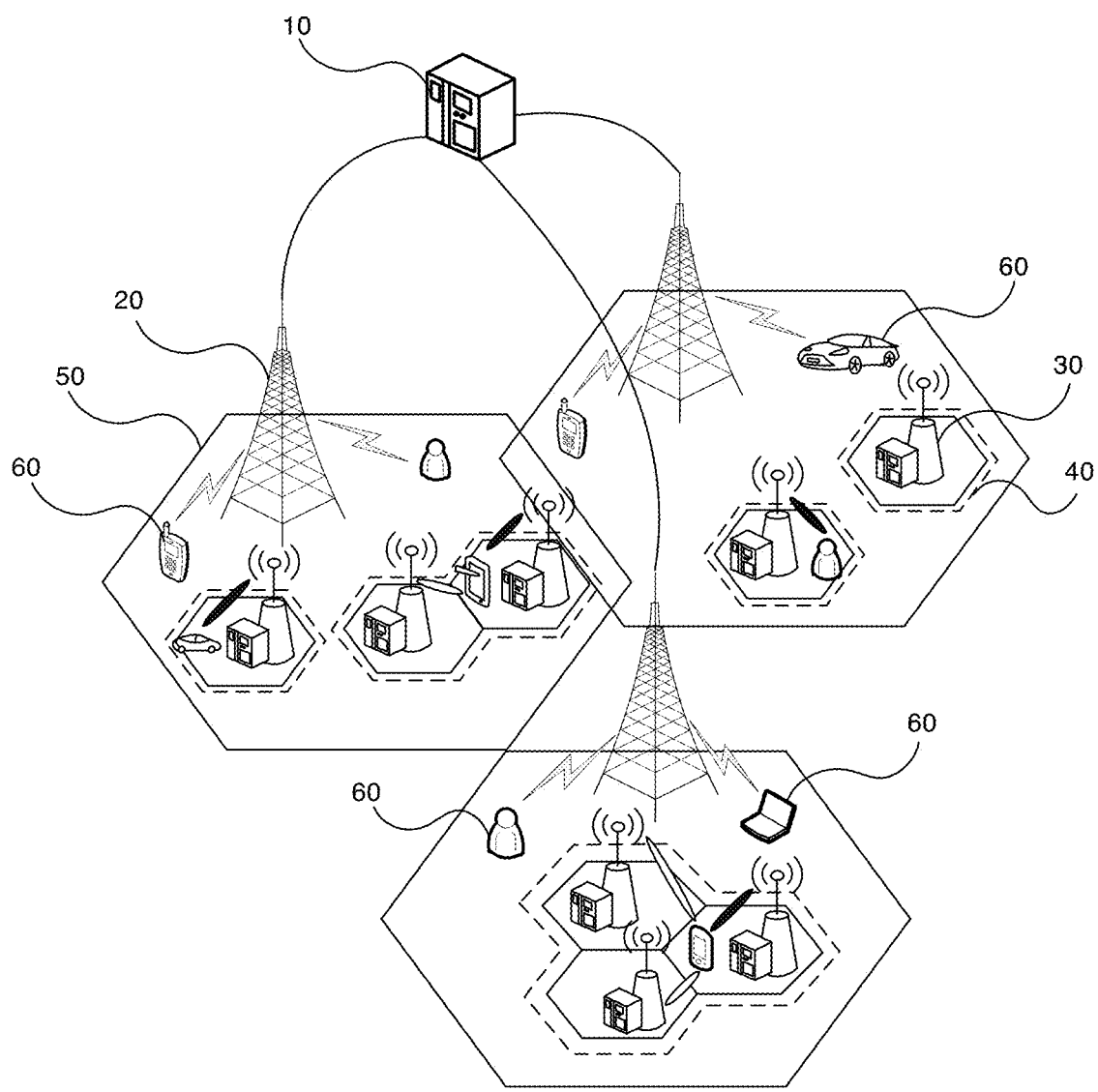
FIG. 1 is a schematic diagram illustrating a wireless communication network.

FIG. 1 is a schematic diagram illustrating a wireless communication network. As shown in FIG. 1, the wireless communication network includes a plurality of macro base stations 20, a plurality of micro base stations 30 and a plurality of user devices (or user equipment, UE) 60.

A UE 60 is a device capable of accessing the wireless communication network for wireless communication services. A UE 60 may be one of any devices including, but not limited to, a feature phone, a smart phone, a wearable device (illustrated as a human in FIG. 1), a vehicle-mounted device (illustrated as a vehicle in FIG. 1), a tablet computer, a laptop computer, etc.

A macro base station 20 is a high power cellular base station covering an area referred to as a macro cell. A micro base station 30 is a low power cellular base station covering a limited area referred to as a micro cell 40.

In some wireless communication schemes, macro base stations 20 and/or micro base stations 30 may cooperate to transmit the same information to the same UE, i.e., joint transmission, in order to improve receiving performances at the UE. For example, a number of micro base stations 30 may form a cluster 50, and cooperate with each other to provide services to UEs covered by the cluster. A central control device 10 is deployed to coordinate the operations of the macro base stations 20 and the micro base stations 30. The central control device 10 may implement management of radio resources, power coordination, interferences, and clusters 50.

FIG. 1 is merely a schematic for illustration, and only devices that are involved in the present application are shown. In practice, a wireless communication network may include various other devices not shown in the drawing, and there may be a lot more devices, such as macro base stations 20, micro base stations 30 and UEs 60, than those shown.

Figure 2:
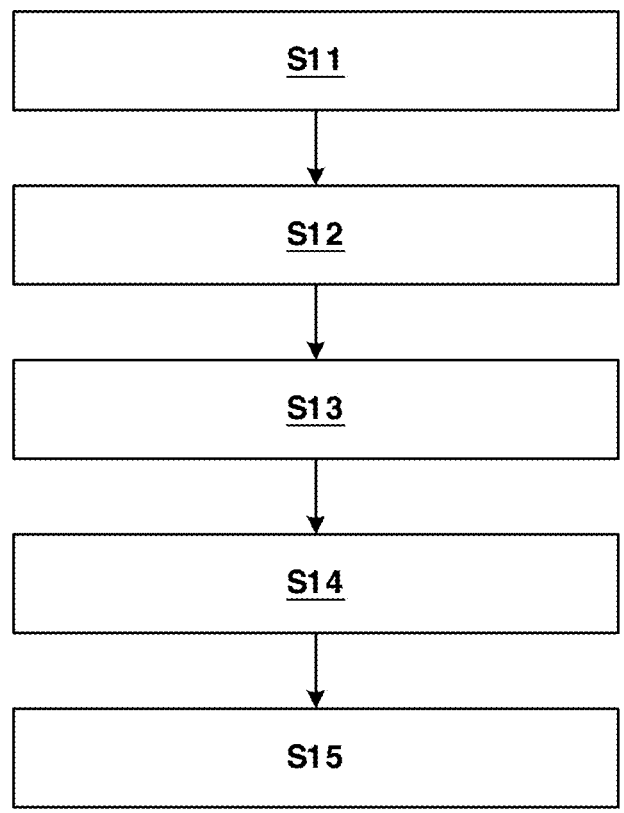
FIG. 2 is a flowchart illustrating a method of establishing a wireless communication network according to various embodiments.

FIG. 2 is a flowchart illustrating a method of establishing a wireless communication network according to various embodiments. The method is applicable to a network which includes a plurality of macro base stations 20, a plurality of micro base stations 30 and a plurality of user devices (UEs) 60.

In block S11, a network device assigns the micro base stations 30 into a plurality of clusters 50, and selects a micro base station 30 from each of the clusters 50 as a cluster head. The network device is in communications with the macro base stations 20 and the micro base stations 30, and may be a central control device 10, a macro base station 20, another device in the network, or the like.

In block S12, the network device receives information about candidate sub-clusters determined by UEs 60 from cluster heads of the clusters 50. Each of the candidate sub-clusters includes micro base stations 30 whose signal power received at a UE 60 exceeds a pre-defined threshold.

A UE 60 may measure signals received from neighboring micro base stations 30, and identify micro base stations 30 whose signal strengths exceeds a threshold. In some embodiments, the threshold may be a pre-defined value. In some embodiments, the threshold may be determined based on the measurements obtained, e.g., by taking one of the measured signal strengths as the threshold, or by taking a calculation result of at least one of the measured signal strengths according to a pre-defined calculation method as the threshold.

A UE 60 may report information about the set of base stations, including at least one micro base station 30, to a serving micro base station 30 as the candidate sub-cluster of the UE 60. The serving micro base station 30 may report the information about candidate sub-clusters received from UEs 60 to the cluster head of the cluster 50 to which the serving micro base station 30 belongs.

In block S13, the network device identifies at least two schemes of grouping the micro base stations 30 into non-overlapping sub-clusters based on the candidate sub-clusters. Each micro base station 30 belongs to not more than one of the non-overlapping sub-clusters in each of the at least two schemes.

In block S14, for a scheme of the at least two schemes, the network device makes each of the UEs 60 select to access a macro base station 20 or to be associated with one of the non-overlapping sub-clusters of the scheme base on respective measurements of signals received from at least one of a macro base station 20 and a sub-cluster of the non-overlapping sub-clusters of the scheme, and acquires information about power consumption of each of the macro base stations 20 and power consumption of each of the micro base stations 30 in communications with the UEs which performs inter-symbol interference suppression and inter-carrier interference suppression at the UEs.

The network device may deploy the network as specified in each of the scheme in turn, and obtain required information about each scheme. For a scheme, the network device may make the micro base stations 30 to work in sub-clusters defined in the scheme. Herein, a "sub-cluster" refers to a cluster generated in block S13, contrary to the "cluster" generated in S11. To UEs 60, a "sub-cluster" is treated as a conventional cluster.

The inter-symbol interference suppression and inter-carrier interference suppression performed at the UEs can improve reception performances, enable transmissions with smaller transmitting power of the micro base stations and thus improve energy efficiency. A UE 60 may suppress inter-symbol interference by subtracting a tail of a first symbol from a second symbol before recovering the second symbol. The first symbol is received from a sub-cluster performing joint transmission, and the second symbol is received following the first symbol from the sub-cluster. A UE 60 may suppress inter-carrier interference by adding a tail estimated of the second symbol to the second symbol before recovering the second symbol. The inter-symbol interference suppression and inter-carrier interference suppression may be performed after quantization of received joint transmission signals.

In block S15, the network device makes the micro base stations 30 perform joint transmissions in sub-clusters as specified in a scheme selected from the at least two schemes according to the information about power consumption.

The network device uses the information collected during trial-run of each of the schemes to decide which scheme is to be used. The selection may be carried out using pre-determined criteria, such as selecting the scheme which maximizes system capacity or which generates the lowest power consumption or which generates the best result of calculations involving several aspects of system performances.

According to embodiments, the network device may select, from a cluster, a micro base station with the lightest load in the cluster as the cluster head. The cluster head may collect information about micro base stations in the cluster and report the information to the network device for clustering. Choosing a light-load micro base station as the cluster head can avoid adding too much workload to a busy micro base station, and minimize the impact of such information collection work on wireless access services provided to UEs.

According to embodiments, the network device may assign the micro base stations 30 into a pre-defined number of clusters which include similar number of micro base stations. The network device may use various clustering methods to generate the clusters with the pre-defined number as a constraint. The clustering methods may include dedicated method designed for the network, or off-the-shelf clustering methods. For example, the network device may use a clustering method such as k-means, K-Nearest Neighbor (KNN), Support Vector Machine (SVM), or the like. As such, the clustering of block S11 can divide the micro base stations coarsely into quasi-uniform clusters to reduce the complexity of managing the clusters.

According to embodiments, the network device may group micro base stations of a cluster into non-overlapping sub-clusters based on candidate sub-clusters which comprise micro base stations of the cluster. The sub-clusters are generated by sub-dividing the clusters generated in block S11. Compared with directly clustering all of the micro base stations 30 into fine clusters (i.e., the sub-clusters), the two-stage clustering of various embodiments can significantly reduce the implementational complexity.

According to embodiments, the network device may group micro base stations of a cluster into non-overlapping sub-clusters using a graph-based algorithm or a tree-based algorithm, such as maximum independent sets of graph, the greedy algorithm, the simulated annealing (SA) algorithm, the genetic algorithm (GA), or the like. For example, the network device may use a graph-based approach to obtain the non-overlapping sub-clusters. The network device may describe the candidate sub-clusters using a graph. In the graph, each vertex represents a candidate sub-cluster, and an edge between two vertices of the graph indicates two candidate sub-clusters corresponding to the two vertices have a common micro base station. The network device may acquire at least two maximum independent sets of the graph as the at least two schemes.

According to embodiments, the network device may obtain system capacity and total power consumption of all of the macro base stations and the micro base stations under each of the at least two schemes, and select a scheme which has the largest ratio of system capacity to total power consumption in the at least two schemes as the scheme selected from the at least two schemes. As such, the final clustering scheme is the one that is most energy efficient.

According to embodiments, the network device may obtain information about load of all of the macro base stations and the micro base stations; when changes in the load of all of the macro base stations and the micro base stations satisfy a pre-determined condition, re-perform the two-stage clustering process, i.e., the identifying procedure and the making procedure in blocks S11 to S15, to update the scheme selected.

Figure 3:
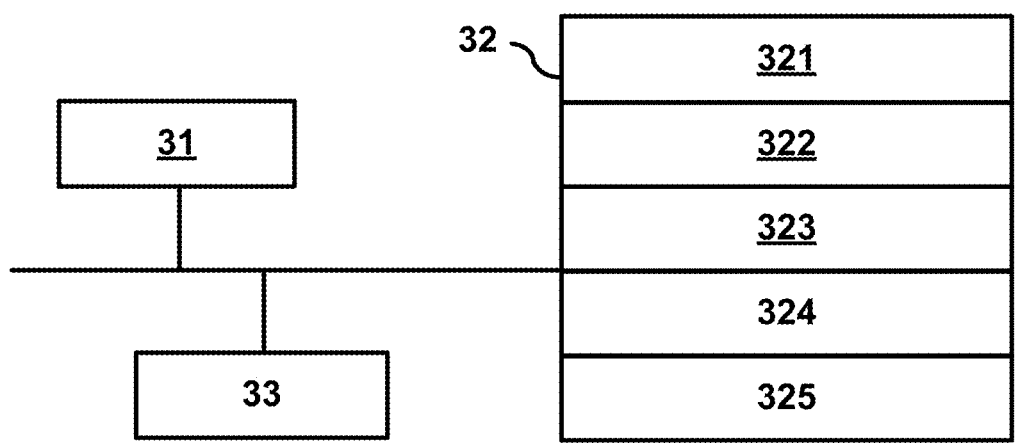
FIG. 3 is a schematic diagram illustrating a network device according to embodiments.

The network device may be implemented by hardware modules or hardware executing software instructions. Hardware module may be implemented by, for example, FPGA, ASIC, dedicated chips, or the like. FIG. 3 is a schematic diagram illustrating a network device according to embodiments. As shown in FIG. 3, the network device may include the following modules.

A pre-clustering module 321 assigns the micro base stations into a plurality of clusters and selects a micro base station from each of the clusters as a cluster head.

A candidate cluster collecting module 322 receives from cluster heads of the clusters, candidate sub-clusters determined by UEs. Each of the candidate sub-clusters comprises micro base stations whose signal power received at a UE exceeds a pre-defined threshold.

A sub-clustering module 323 identifies at least two schemes of grouping micro base stations into non-overlapping sub-clusters based on the candidate sub-clusters. Each micro base station belongs to not more than one of the non-overlapping sub-clusters in each of the at least two schemes.

An operational data collecting module 324 collects information when the base stations operates under each of the schemes. Specifically, for a scheme of the at least two schemes, the operational data collecting module 324 makes each of the UEs select to access a macro base station or to be associated with one of the non-overlapping sub-clusters of the scheme base on respective measurements of signals received from at least one of a macro base station and at least one sub-cluster of the non-overlapping sub-clusters of the scheme, and acquires information about power consumption of each of the macro base stations and power consumption of each of the micro base stations in communications with the UEs which performs inter-symbol interference suppression and inter-carrier interference suppression at the UEs.

A scheme selecting module 324 makes the micro base stations perform joint transmissions in sub-clusters as specified in a scheme selected from the at least two schemes according to the information about power consumption.

Details about the actions of the various modules are as described in other embodiments, e.g., can be found in descriptions in connection with corresponding method steps in method embodiments.

In some embodiments, the network device may also include a processor 31, a memory 32 which stores machine-readable instructions, and a communication device 33 for communicating with other devices in the network. The machine-readable instructions are executable by the processor 31 to implement the method of various embodiments.

Figure 4:
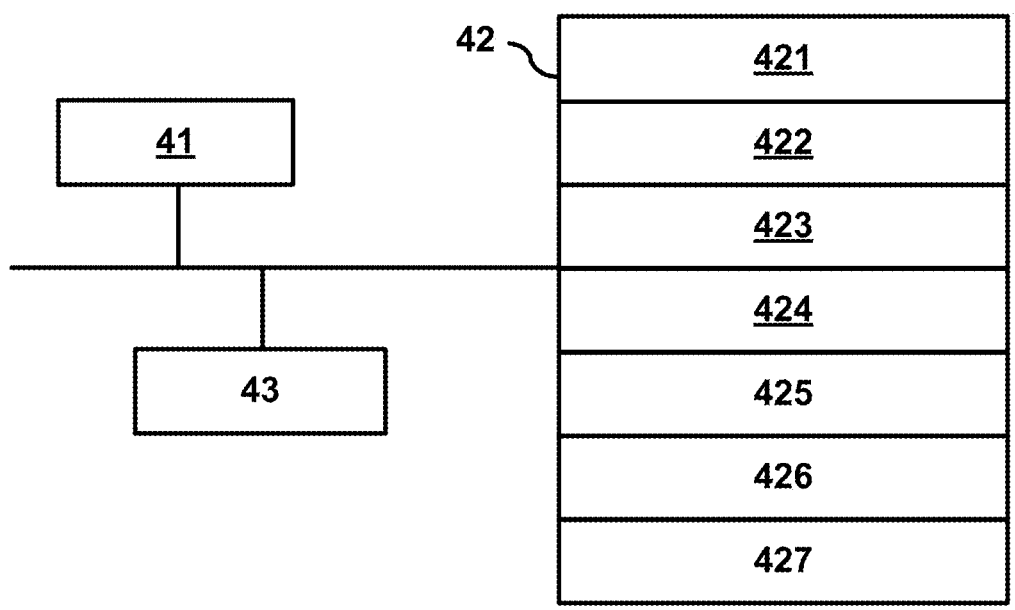
FIG. 4 is a schematic diagram illustrating a UE according to embodiments.

The UE 60 may be implemented by hardware modules or hardware executing software instructions. Hardware module may be implemented by, for example, FPGA, ASIC, dedicated chips, or the like. FIG. 4 is a schematic diagram illustrating a UE according to embodiments. As shown in FIG. 4, the UE may include the following modules.

A first measuring module 421 obtains first measurements of signals received from at least one of a macro base station and at least one micro base station.

A sub-cluster determining module 422 determines, using the first measurements, a candidate sub-cluster which comprises micro base stations whose signal power received by the UE exceeds a pre-defined threshold.

A reporting module 423 sends information about the candidate sub-cluster to a serving base station.

A second measuring module 424 obtains second measurements of signals received from at least one of a macro base station and at least one sub-cluster.

An access selecting module 425 selects, using the second measurements, to access a macro base station or to be associated a sub-cluster.

An inter-symbol interference suppressing module 426 suppresses inter-symbol interference of joint transmission of a sub-cluster by subtracting a tail of a first symbol of the joint transmission from a second symbol received following the first symbol before recovering the second symbol.

An inter-carrier interference suppressing module 427 suppresses inter-carrier interference by adding a tail estimated of the second symbol to the second symbol before recovering the second symbol.

In embodiments, the UE 60 may also include a time difference estimating module and a symbol recovering module. The time difference estimating module estimates a time difference between transmission signals from two micro base stations performing joint transmission of a sub-cluster using cell-specific reference signals (CRS) of the two micro base stations, the transmission signals comprise no cyclic prefix. The symbol recovering module recovers the second symbol from the transmission signals using the time difference. As such, the UE can realize synchronization of joint transmission signals without requiring cyclic prefix, and base stations do not have to transmit cyclic prefix. Therefore, signaling overheads and spectrum consumption resulted from transmitting cyclic prefix can be reduced. In embodiments, the UE 60 may also include an equalization module which processes, using an equalization filter before recovering the second symbol, the second symbol to which the tail estimated of the second symbol has been added. Using the equalization filter can eliminate impacts of the asynchrony of joint transmissions on signal phases.

In some embodiments, the UE may also include a processor 41, a memory 42 which stores machine-readable instructions, and a communication device 43 for communicating with other devices in the network. The machine-readable instructions are executable by the processor 41 to implement the method of various embodiments.

An embodiment provides an energy efficiency centric (EEC) multiple base station cooperation strategy and an interference management scheme for asynchronous transmission by cooperative BSs. The method of various embodiments can construct an EEC heterogeneous network architecture for densely deployed wireless heterogeneous networks. In the embodiment, a network device performs quasi-uniform pre-clustering of micro BSs using the k-means clustering algorithm, and then performs sub-clustering, i.e., obtains non-overlapping sub-clusters based on overlapping cooperative candidate clusters of micro BS UEs using maximum independent sets of graph. The embodiment adjusts the number of UEs accessing macro BSs and the number of UEs micro BS clusters through a user association process, and provides an interference management method during non-ideally synchronized joint transmission of micro BSs, to construct non-overlapping semi-dynamic cooperative clusters with maximum energy efficiency.

In an embodiment, the procedure in block S11 may be carried out as follows. A two-layer heterogeneous cellular network model is constructed. Randomly distributed micro BSs are pre-clustered using the k-means algorithm, and cluster heads are selected by a network device, e.g., a central control device.

The network is constructed with a two-layer heterogeneous cellular network structure. Based on the random deployment of BSs, macro BSs and micro BSs are modeled as random geometric models of Poisson point process (PPP). UEs around BSs are in a two-dimensional Gaussian distribution. In the ultra-dense heterogeneous network, the set of macro BSs is denoted by $B_{Macro}$, the set of micro BSs is denoted by $B_{Micro}$, and the set of UEs is denoted by U. The number of macro BSs is |Bmacro|, the number of micro BSs is $|B_{Micro}|$, and the number of UEs is |U|. Orthogonal frequency resources are allocated to the macro BSs and the micro BSs to avoid cross-layer interferences.

This scheme considers a semi-dynamic clustering method, which is to pre-cluster according to the distribution of BSs, and then select several sub-clusters from the pre-clusters according to the UE's situation. The number of clusters will be less than or equal to the pre-cluster. Therefore, a trade-off between overhead and gain can be sought. Since the k-means clustering method has a fast convergence speed and can form multiple cooperative sets of micro BSs with controllable sizes, it is considered to use the k-means network pre-clustering to obtain the pre-cluster set. And k-means pre-clustering first randomly generates k points as the initial points of the mean. Then the points near each mean can be used as a cluster, and then a new mean can be iterated through the set of points in the cluster until the algorithm converges or the number of iterations is sufficient.

The cluster heads are selected based on loads of the micro BSs, e.g., the BS with the lightest load may be selected as a cluster head. A cluster head collects the channel state information of each BS in a cluster, cooperates with a cloud server to perform resource allocation for coordinated transmissions. When the set of UEs all of which have established a connection with micro BS b is denoted by $U_b$, the bandwidth configured for a UE u served by micro BS b is denoted by $w_{b,u}$, and the total bandwidth of micro BS b is denoted by $W_b$, the load of micro BS b is defined as $$L_b = \sum_{u \in U_b} \frac{w_{b,u}}{W_b}$$

In an embodiment, the procedure in block S12 may be implemented as follows.

A UE identifies interfering neighboring BSs, and selects a micro BS which generates interference greater than a threshold to the UE as a cooperative BS according to received signal power.

In an example, a UE u determines a serving micro BS $b_u^k$ in the k-th pre-cluster $P_k$. A UE may select the nearest micro BS as $b_u^k$. It is assumed that all of micro BSs in a cluster has the same transmitting power, the signal power $P_u^k$ received by UE u from the serving micro BS $b_u^k$ is the reference signal receiving power (RSRP), and a threshold is defined to be $T_u^k = P_u^k - \eta$, $\eta$ is a preset value. When the signal power $P_b^k$ received from a micro BS b (including the serving micro BS) satisfies $P_b^k \geq T_u^k$, the micro BS b is determined as an interfering micro BS of UE u, and a set of interfering micro BSs of UE u, denoted by $B_u^k$, is determined as $$B_u^k = \{b^k \in B_{Micro} | P_b^k \geq T_u^l\}$$

The set of interfering micro BSs is the cooperative micro BS set of UE u, also referred to as a cooperative BS set or a candidate sub-cluster.

The number of BSs is $B_k$, and the number of UEs is $U_k$ in the k-th pre-cluster. It is defined that $X_u^k = [x_{u,1}^k, \ldots, x_{u,b}^k, \ldots, x_{u,B_k}^k]$, and $x_{u,b}^k \in (0,1)$. When a BS b $\in B_u^k$, the element $x_{u,b}^k = 1$; otherwise, the element $x_{u,b}^k = 0$. When $X_u^k$ has at least two non-zero elements, UE u reports information about $X_u^k$ to the serving BS $b_u^k$, and BS $b_u^k$ reports information about $X_u^k$ of all of UEs connected to BS $b_u^k$ to the cluster head which reports the information to the network device. Different $X_u^k$ correspond to different cooperative BSs sets. Matrix $X^k = [X_1^k, \ldots, X_u^k, \ldots, X_{U_k}^k]^T$ is defined, and $X^k$ denotes cooperative BSs of all of UEs in k-th pre-cluster, i.e., candidate sub-clusters. Each UE may obtain a candidate sub-cluster. The network device may obtain a set of unique candidate sub-clusters $CS_n = \{BS \ b | x_{u,n} = 1\}$ by removing all of repeated candidate sub-clusters.

In an embodiment, the procedure in block S13 may be implemented as follows. According to the interference received by different micro cell UEs, different cells cooperate to form overlapping candidate sub-clusters, and non-overlapping sub-clustering results can be obtained based on a graph-based method such as the maximum independent sets of graph.

Candidate sub-clusters obtained by different UEs through discovering interfering neighboring BSs may overlap with one another, which results in resource conflict and places higher requirements for resource allocation. As such, embodiments use the approach of maximum independent sets of graph to address the overlapping of candidate sub-clusters. Graph G=(V,E) is used to represent the overlapping relationship between different candidate clusters, with vertices $V=CS_u$ and edges E. If candidate sub-clusters $CS_u$ and $CS_j$ have at least one common BS, $(CS_u, CS_j) \in E$, i.e., there is an edge between vertices corresponding to $CS_u$ and $CS_j$. All of the maximum independent sets of graph G may be identified using a method, e.g., the greedy criterion, Simulated Annealing (SA), or the like. Multiple non-overlapping sub-clustering schemes may be obtained, each corresponding to one scheme of dividing the graph G according to the maximum independent sets.

Figure 5:
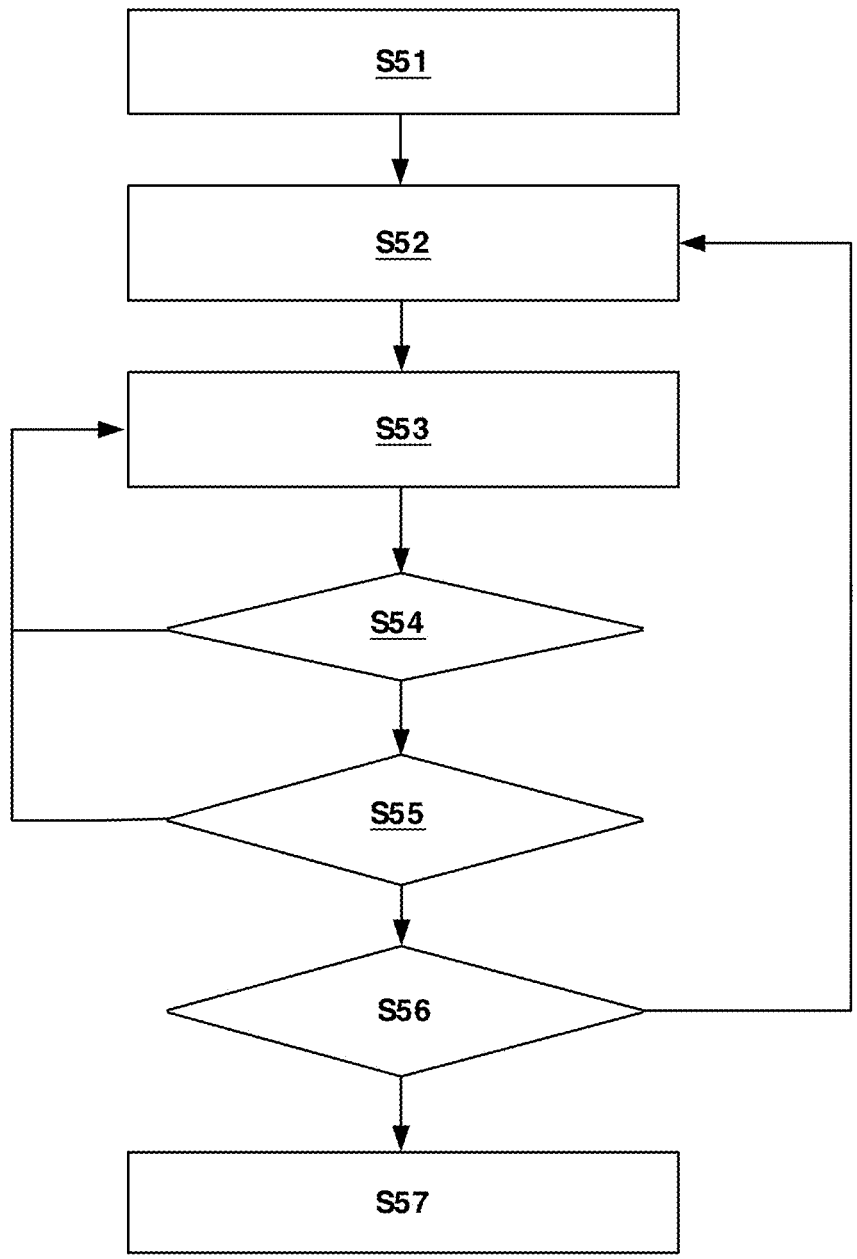
FIG. 5 is a flowchart illustrating a process of obtaining the maximum independent set of graph based on the greedy criterion.

The maximum independent sets of graph is an NP-hard problem. FIG. 5 is a flowchart illustrating a process of obtaining the maximum independent set of graph based on the greedy criterion. As shown in FIG. 5, the process may include the following procedures.

S51: An initial state graph $G_0 = G$ is obtained according to the overlapping relationships between the candidate sub-clusters. Given the maximum independent set I=∅, the maximum independent set is searched for starting from UE u=1.

S52: The candidate sub-cluster $CS_u \in V(G_0)$ of UE u is selected. $I = I \cup CS_u$ is used to update the graph to obtain $G'_0 = G_0 - CS_u \cup N(CS_u)$, where $N(CS_u)$ is the candidate sub-cluster of an adjacent node (i.e., an adjacent UE) of $CS_u$, and make $G'_u = G'_0$.

S53: All vertices of graph $G'_0$ are sorted according to the number of associated edges of the vertices, the candidate sub-cluster vertex $CS_i$ with the smallest number of associated edges is selected, and the maximum independent set $I/=I \cup CS_i$ is updated. The graph is updated continuously as $G''_0 = G'_0 - CS_i \cup N(CS_i)$.

S54: It is determined whether $G''_0$ is an empty graph. If $G''_0$ is an empty graph, S55 may be performed; otherwise, make $G'_0 = G''_0$, and S53 is performed to continue updating the maximum independent set.

S55: A maximum independent set I of $CS_u$ is obtained. Make $CS_i^u$ be the vertex with the smallest number of associated edges in GL, the graph is updated with $G'_u = G'_u - CD_i^u$, and edges associated with $CS_i^u$ are deleted. Make $G'_0 = G'_u$, and perform S53. Repeat S53, S54, and S55 until all vertices of graph $G'_0$ have been selected. All of maximum independent sets based on CS u can be obtained, and S56 is performed.

S56: It is determined whether all of vertices have been selected as the start point for the search of maximum independent sets. If all of vertices have been selected, the maximum independent sets corresponding to each vertex can be obtained, and S57 is performed. Otherwise, if not all of vertices have been selected, update the UE u=u+1 and perform S52 to change the selected candidate sub-cluster vertex $CS_u$, and repeat S53, S54, S55, and S56 until all vertices have been selected.

S57: All of maximum independent sets $I(CS_u)$ corresponding to each initially selected vertex $CS_u$ are obtained. A non-overlapping sub-clustering scheme corresponding to each set of maximum independent sets is obtained after repeated sets and sets which are proper subsets of other sets are deleted.

In an embodiment, the procedure in block S14 may be implemented as follows.

The network device deploys the network according to each non-overlapping sub-clustering scheme to make the micro BSs operate in sub-clusters of each non-overlapping sub-clustering scheme in turn, and collects desired information for deciding the non-overlapping sub-clustering scheme to be used.

Under each of the non-overlapping sub-clustering schemes, it is determined whether to associate a UE with a non-overlapping sub-cluster (which is a micro BS cooperative cluster, also referred to as a cooperative cluster) or to make the UE access a macro BS which has the shortest distance to the UE.

According to the signal to interference and noise ratio (SINR)$\gamma_u$ received by UE u in the cooperative cluster, it is determined whether to associate the UE u with the micro BS cooperative cluster. If $\gamma_u$ is greater than a preset SINR threshold $\gamma$, it is determined to associate the UE with the micro BS cooperative cluster; otherwise, it is determined to make the UE access the nearest neighboring macro BS. The set of macro cell UEs can be obtained as $U_{Macro}$, the set of micro cell UEs can be obtained as $U_{Micro}$, the number of macro cell UEs is $|U_{Macro}|$, and the number of micro cell UEs is $|U_{Micro}|$. Therefore, the set of all of UEs is $U=U_{Macro} \cup U_{Micro}$, $U_{Macro} \cap U_{Micro} = \emptyset$.

A cooperative transmission state matrix $Q^{(n)} \in C^{|U| \times (|B_{Micro}|+1)}$ is constructed using a non-overlapping clustering scheme and the user association scheme, $n=\{1, 2, \ldots, N\}$, N is the number of the non-overlapping clustering schemes, $Q^{(n)}$ denotes the n-th clustering scheme, $q_{i,j}^{(n)}$ denotes the element in the i-th row and the j-th column of $Q^{(n)}$. For elements in the first $|B_{Micro}|$ columns, if micro BS j provides service to UE i, $q_{i,j}^{(n)}=1$; otherwise, $q_{i,j}^{(n)}=0$. The $(|B_{Micro}|+1)$-th column includes the bits indicating UE association. When a UE is associated with the micro BS cooperative cluster, $q_{i,|B_{Micro}|+1}=1$; when the UE accesses a macro BS, $q_{i,|B_{Micro}|+1}=0$. As such, the cooperative transmission state matrices of all of the non-overlapping clustering schemes can be obtained.

In an embodiment, Zero-Forcing (ZF) precoding is used to suppress the intra-cluster interference of the cooperative BSs sub-clusters in the MIMO system.

After processing by non-overlapping clustering, the current scheme of sub-clustering is denoted by $C=\{1, \ldots, c, \ldots, C\}$. There are C cooperative clusters in total. c denotes the c-th cooperative cluster. In each cooperative cluster, intra-cluster interference management is implemented based on ZF precoding. The set of UEs served by cooperative cluster is $U^c=\{1; \ldots, u_c, \ldots, U_c\}$c. In cooperative cluster c, the number of BSs is $B_c$ and the number of UEs is $U_c$. Signals transmitted by a BS are subject to large-scale fading and small-scale fading. Channels are Rayleigh channels. The small-scale fading matrix of cooperative cluster c is $$H_c = [h^1, \ldots, h^{u_c}, \ldots, h^{U_c}]^T \in C^{U_c \times B_c}$$

where $h^{u_c} = [h^{0,u_c}, \ldots, h^{b_c,u_c}, \ldots, h^{B_c-1,u_c}] \in C^{1 \times B_c}$. The small-scale fading coefficient $h^{b_c,l_c}$ follows the unit exponential distribution, i.e., the parameter $\lambda=1$. When $R_{b_c,u_c}^{-a}$ denotes the large-scale fading coefficient between BS b and UE u in cooperative cluster c, $R_{b_c,u_c}$ denotes the distance between BS b and UE u, a is the path loss coefficient, it can be obtained that the overall channel gain coefficient between BS b and UE u is $g^{b_c,u_c} = h^{b_c,u_c} R_{b_c,u_c}^{-a}$, and the overall channel gain matrix of cooperative cluster c is $G_{S_k} \in C^{U_c \times B_c}$.

Regarding downlink transmission, in ideal situations, the received signal of UE u in cooperative cluster c is $$y^{u_c} = \sum_{b_c=0}^{B_c-1} g^{b_c,u_c} v^{b_c,u_c} s^{u_c} + \sum_{b_c=0}^{B_c-1} \sum_{l=1,l\neq u}^{U_c} g^{b_c,u_c} v^{b_c,l_c} s^{l_c} + \sum_{e=1,e\neq c}^{C} \sum_{b_e=0}^{B_e-1} \sum_{l=1}^{U_e} g^{b_e,u_c} v^{b_e,l_e} s^{l_e} + z^{u_c}$$

in which $\sum_{b=0}^{B_c-1} g^{b_c,u_c} v^{b_c,u_c} s^{u_c}$ indicates useful signal; $\sum_{b=0}^{B_c-1} \sum_{l=1,l\neq u}^{U_c} g^{b_c,l_c} v^{b_c,l_c} s^{l_c}$ is intra-cluster interference. Moreover, $s^{u_c}$ is the product of the normalized data symbol $f^{u_c}$ with $E[f^{u_c}(f^{u_c})^H]=1$ and the power allocation weight $p_{b_c,u_c}$, thus the power allocated to UE u is P bctic denotes the cooperative precoding of the b-th BS in cooperative cluster c for UE u which is served by the b-th BS; $s^{l_c}$ denotes the signal transmitted by the cooperative cluster c to a UE l which is one of $U^c$ and is not UE u; $v^{b_c,l_c}$ denotes the cooperative precoding used by the cooperative cluster c for a UE l which is one of $U^c$ and is not UE u; $g^{b_c,u_c}$ denotes the overall channel gain between UE u and BS b which belongs to a cooperative cluster e other than cooperative cluster c; $v^{b_e,l_e}$ denotes the cooperative precoding used by cooperative cluster e for UE l which is served by cooperative clustere; $s^{l_e}$ denotes the signal transmitted by cooperative cluster e to UE l; $z^{u_c} \sim CN(0, \sigma_{u_c}^2)$ denotes Gaussian white noise with a mean value of 0 and a variance of $\sigma_{d_c}^2$. When the ZF-based precoding technology is used in the micro BS cooperative cluster, the precoding matrix is $$\tilde{V}_c = [\tilde{v}^1, \ldots, \tilde{v}^{u_c}, \ldots, \tilde{v}^{U_c}] = G_c^H (G_c G_c^H)^{-1}$$

where $\tilde{v}_{u_c}$ denotes the ZF weight for each channel gain vector. The normalized $\tilde{v}^{u_c}$ is defined as $v^{u_c} = \tilde{v}^{u_c}/\|\tilde{v}^{u_c}\| = [v^{B_c-1,u_c}]$. The symbol $\|*\|$ refers to the operation of obtaining the modulo value of the complex number.

After the ZF precoding technology is applied to eliminate intra-cluster interference, in an ideal transmission conditions, signal from the serving BS and cooperative BSs arrive at the UE at the same time, the received signal of UE u in the cluster c is $$y^{u_c} = \sum_{b_c=0}^{B_c-1} g^{b_c,u_c} v^{b_c,u_c} s^{u_c} + \sum_{e=1,e\neq c}^{C} \sum_{b_e=0}^{B_e-1} \sum_{l=1}^{U_e} g^{b_e,u_c} v^{b_e,l_e} s^{l_e} + z^{u_c}$$

Figure 6:
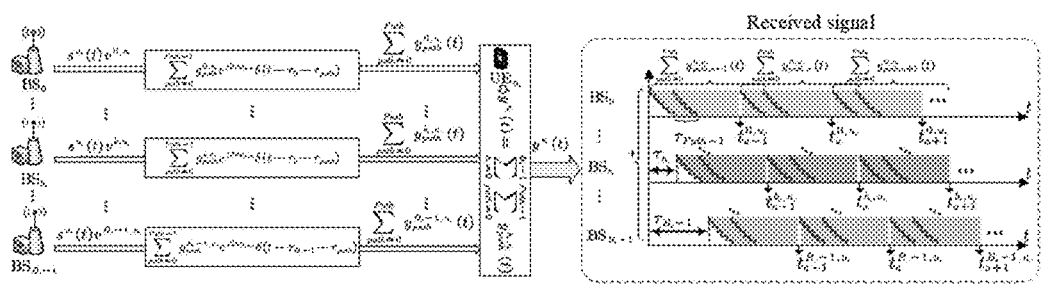
FIG. 6 is a schematic diagram illustrating different channel delays from different base stations to a UE.

The total delay at the receiver mainly includes asynchronous transmission delay and multipath delay. FIG. 6 is a schematic diagram illustrating different channel delays from different BSs to a UE. The impact of multipath delays can be effectively reduced via cyclic prefix (CP) insertion. Therefore, this scheme considers a method of delay gap (also called asynchronous gap) generation and compensation at the receiver, which eliminates the problem of interference caused by asynchronous transmission delay. In the non-ideal situations, UE $u_c$ receives the first multipath signal transmitted by the serving BS $b_0$ at time spot $t_0$, and receives the first multipath signal transmitted by a cooperative BS $b_c$ at time spot $t_{b_c}(t_{b_c} \neq t_0)$, the asynchronous transmission delay $\tau_{b_c} = t_{b_c} - t_0$. The time-domain channel for joint transmission of the cooperative BSs is $g^{u_c}(t) = g_1^{u_c}(t) * g_2^{u_c}(t) = \sum_{b_c=0}^{B_c-1} \delta(t-\tau_{b_c}) * \sum_{path=0}^{Path-1} g_{path}^{b_c,u_c} e^{j2\pi\phi_{path}} \delta(t-\tau_{path}) = \sum_{b_c=0}^{B_c-1} \sum_{path=0}^{Path-1} g_{path}^{b_c,u_c} e^{j2\pi\phi_{path}} \delta(t-\pi_{b_c} - \pi_{path})$ where $g_1^{u_c}(t) = \sum_{b_c=0}^{B_c-1} \delta(t-\tau_{b_c})$ is time-domainchannel with asynchronous transmission delay between UE u and BS b in the cluster c, and $g_2^{u_c}(t) = \sum_{path=0}^{Path-1} g_{path}^{b_c,u_c} \delta(t-\tau_{path})$ represents time-domain channel with multipath delay. And $\tau_{path}$ denotes multipath delay of pathth; $g_{path}^{b_c,u_c}$ is the channel gain of the path-th multipath for the b-th BS and satisfies $\sum_{path=0}^{Path-1} g_{path}^{b_c,u_c} e^{j2\pi\phi_{path}} = g^{b_c,u_c}$; $2\pi\phi_{path}$ is a random phase of path-th multipath; Path represents the number of multipaths. When the user processes the received signal, it mainly performs interference cancellation on the signals jointly transmitted. And the user receives the signals transmitted by all cooperative micro BSs are define as $$y_{JT}^{u_c}(t) = \sum_{b_c=0}^{B_c-1} \sum_{path=0}^{Path-1} y_{path}^{b_c,u_c}(t) = s^{u_c}(t) * g^{u_c}(t) v^{b_c,u_c}$$

where $y_{path}^{b_c,u_c}(t) = [y_{path,1}^{b_c,u_c}(t), y_{path,2}^{b_c,u_c}(t), \ldots, y_{path,a}^{b_c,u_c}(t), \ldots]$ and $y_{path,a}^{b_c,u_c}(t)$ indicates the a-th OFDM symbol received transmitted by the b-th BS in path-th multipath.

In an embodiment, in order to estimate the TOA difference between signals from two cooperative BSs of a cooperative cell to the same UE, a CRS signal may be inserted into a resource block transmitted by each of the two BSs, and the TOA difference may be estimated using the phase relationship between the CRS signals in the frequency domain, for example, using the following formula:

$$cor = \sum_{k=0}^{M-2} crs(k) \cdot [crs_r x(D \cdot k)]^* \cdot crs(k+1) \cdot [crs_r x(D \cdot (k+1))]^*$$

$$t = \frac{N\theta(cor)}{2\pi DM}$$

$(\cdot)^*$ is the conjugation operator. $crs(\cdot)$ is a local CRS signal, and $crs_r x(\cdot)$ is a received CRS signal. M is the total number of CRS signals in an OFDM symbol. D is the subcarrier spacing between two adjacent CRS signals of each antenna. N is the total number of subcarriers of an OFDM symbol. $\theta(\cdot)$ is an operator for obtaining the phase. t is the time taken by the transmitting signal traveling from the BS to the UE, referred to as time of arrival (TOA) herein.

The TOA difference of the serving BS BS_1, denoted by $t_0$, and the TOA difference of the cooperative BS BS_2, denoted by $t_1$, may be calculated according to the above method. The TOA difference $\tau_1$ between signals from BS_1 and BS_2, which represents the delay of the transmitting signal of BS_2 compared with the transmitting signal of BS_1, can be calculated as $t_1 - t_0$.

Assuming that the time length of an OFDM symbol is $T_B$, the relative length of the OFDM symbol is defined as $M = T_B/T_s$. It means that an OFDM symbol contains M modulation symbols. M sampling points are taken from an OFDM symbol at uniform intervals. $T_s$ is the modulation symbol period and sampling period. Since the signal is discretized, the a-th transmitted OFDM symbol is $[s_a^{u_c}(n)]_{n=0}^{M-1}$.

The delay relative length of the path-th multipath for b-th cooperative BS is $$d_{path}^{b_c} = \lceil \tau_{b_c}/T_s \rceil + \lceil \tau_{path}/T_s \rceil = L_{b_c} + L_{path}$$

Thus, the base-band equivalent form of the channel impulse response is given by $$g = g_1 * g_2 = [g^{u_c}(n)]_{n=0}^{d_{Path-1}^{B_c-1}} =$$

$$\left[\sum_{b_c=0}^{B_c-1} \delta(n - L_{b_c})\right]_{n=0}^{L_{B_c-1}} * \left[\sum_{path=0}^{Path-1} g_{path}^{b_c,u_c} e^{j2\pi\phi_{path}} \delta(n - L_{path})\right]_{n=0}^{L_{Path-1}} =$$

$$\left[\sum_{b_c=0}^{B_c-1} \sum_{path=0}^{Path-1} g_{path}^{b_c,u_c} e^{j2\pi\phi_{path}} \delta(n - d_{path}^{b_c})\right]_{n=0}^{d_{Path-1}^{B_c-1}} =$$

$$\left[\sum_{d=0}^{d_{Path-1}^{B_c-1}-1} g_d^{u_c} \delta(n-d)\right]_{n=0}^{d_{Path-1}^{B_c-1}}$$

where $g_1 = [\sum_{b_c}^{B_c-1} \delta(n - L_{b_c})]_{n=0}^{L_{B_c}-1}$ is an equivalent form of the channel impulse response with asynchronous transmission delay, and $g_2 = [\sum_{path=0}^{Path-1} g_{path}^{b_c,u_c} \delta(n - L_{path})]_{n=0}^{L_{Path}-1}$ represents the channel impulse response with multipath delay. Considering that the length of the CP is the multipath delay extension length, and the transmitted OFDM symbol is $[s_a^{u_c}(n)]_{n=0}^{M+L_{Path-1}-1}$. Therefore, the a-th received OFDM symbol by all cooperative micro BSs can be described as $$[y_a^{u_c}(n)]_{n+2}^{M+L_{Path-1}-1} * [g^{u_c}(n) v^{b_c,u_c}]_{n=1}^{d_{Path-1}^{B_c-1}},$$

Figure 7:
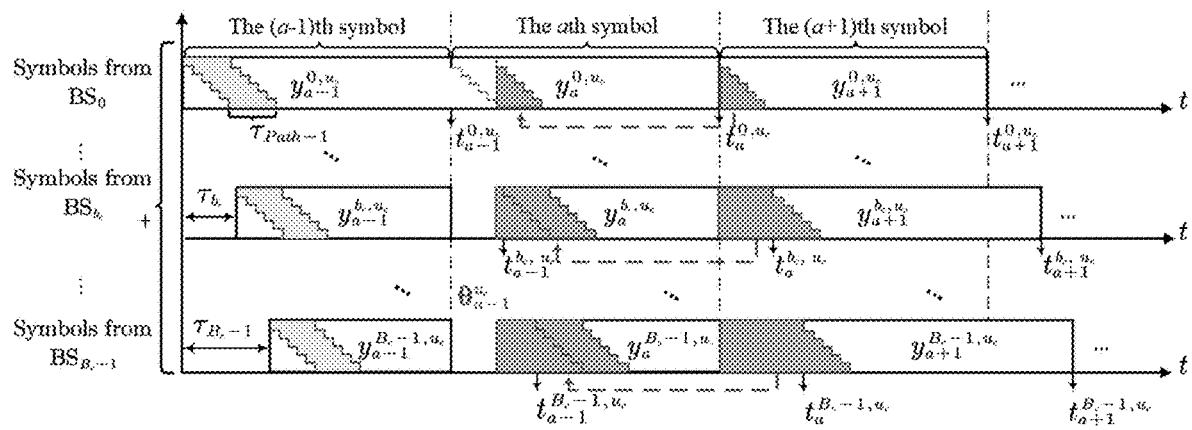
FIG. 7 is a schematic diagram illustrating asynchronization gap generation and compensation according to embodiments.

FIG. 7 is a schematic diagram illustrating asynchronization gap generation and compensation according to embodiments. According to the receiving timing diagram in FIG. 7, the whole process of signal propagation is divided into three stages when receives the a-th OFDM symbol.

In the first stage, when $t \in [t_{a-1}^{0,u_c}, t_{a-1}^{B_c-1,u_c}]$, the relative length processing is $d_{path}^{B_c-1} = \lceil B_{c-1}/T_s \rceil + \lceil \tau_{path-1}/T_s \rceil$ after discretization, which is an inter-symbol interference segment (the segment corresponding to the asynchronization gap zone) $[y_a^{u_c}(n)]_{n=0}^{d_{Path-1}^{B_c-1}}$, and there is the tail interference of the (a−1)-th symbol.

In the second stage, when $t \in [t_{a-1}^{B_c-1,u_c}, t_a^{0,u_c} - \tau_{path-1}]$, its relative length is $(M + L_{Path-1} - d_{Path-1}^{B_c-1})$ after discretization, which is a segment with no inter-symbol interference $[y_a^{u_c}(n)]_{n=d_{Path-1}^{B_c-1}}$, and there is not disturbed.

In the third stage, when $t \in [t_a^{0,u_c} - \tau_{path-1}, t_a^{B_c-1,u_c}]$, its relative length is $d_{Path-1}^{B_c-1}$ after discretization, which is a tail segment $[y_a^{u_c}(n)]_{n=M+L_{Path-1}}^{M+L_{Path-1}+d_{Path-1}^{B_c-1}-1}$, and it will interfere with the (a+1)-th OFDM symbol. Therefore, the a-th received OFDM symbol also can be described as $$[y_a^{u_c}(n)]_{n=0}^{M+L_{Path-1}+d_{Path-1}^{B_c-1}-1} =$$

$$\left\{ [y_a^{u_c}(n)]_{n=0}^{d_{Path-1}^{B_c-1}-1}, [y_a^{u_c}(n)]_{n=d_{Path-1}^{B_c-1}}^{M+L_{Path-1}-1}, [y_a^{u_c}(n)]_{n=M+L_{Path-1}}^{M+L_{Path-1}+d_{Path-1}^{B_c-1}-1} \right\}$$

Assuming that the receiver of the UE is synchronized with the first multipath of the transmission signal by the serving BS and performs $(M + L_{path-1})$ sampling in the a-th symbol interval and the result of the sampling is expressed as:

$$\hat{y}_a^{u_c} = [\hat{y}_a^{u_c}(n)]_{n=0}^{M+L_{Path-1}-1} = [\hat{y}_a^{u_c}(n)]_{n=0}^{d_{Path-1}^{B_c-1}-1} + [y_a^{u_c}(n)]_{n=d_{Path-1}^{B_c-1}}^{M+L_{Path-1}-1} =$$

$$\left[\sum_{d=0}^{d_{Path-1}^{B_c-1}-1} g_d^{u_c} v^{b_c,u_c} s_a^{u_c}(n-d) + \theta_{a-1}^{u_c}(n) + z_a^{u_c}(n)\right]_{n=0}^{d_{Path-1}^{B_c-1}-1} +$$

$$\left[\sum_{d=0}^{d_{Path-1}^{B_c-1}-1} g_d^{u_c} v^{b_c,u_c} s_a^{u_c}(n-d) + z_a^{u_c}(n)\right]_{n=d_{Path-1}^{B_c-1}}^{M+L_{Path-1}-1}$$

To simplify the calculation, let $$\hat{g} = [\hat{g}^{u_c}(n)]_{n=0}^{d_{Path-1}^{B_c-1}-1} =$$

$$\left[\sum_{b_c=0}^{B_c-1} \sum_{path=0}^{Path-1} g_{path}^{b_c,u_c} e^{j2\pi\phi_{path}} v^{b_c,u_c} \delta(n - d_{path}^{b_c})\right]_{n=0}^{d_{Path-1}^{B_c-1}-1} =$$

$$\left[\sum_{d=0}^{d_{Path-1}^{B_c-1}-1} \hat{g}_d^{u_c} \delta(n-d)\right]_{n=0}^{d_{Path-1}^{B_c-1}-1},$$

The $(M + L_{Path-1})$ point sampling of a-th OFDM symbol can also expressed as $$\hat{y}_a^{u_c} = \left[\sum_{d=0}^{d_{Path-1}^{B_c-1}-1} \hat{g}_d^{u_c} s_a^{u_c}(n-d) + \theta_{a-1}^{u_c}(n) + z_a^{u_c}(n)\right]_{n=0}^{d_{Path-1}^{B_c-1}-1} +$$

$$\left[\sum_{d=0}^{d_{Path-1}^{B_c-1}-1} \hat{g}_d^{u_c} s_a^{u_c}(n-d) + z_a^{u_c}(n)\right]_{n=d_{Path-1}^{B_c-1}}^{M+L_{Path-1}-1}$$

The first $d_{Path-1}^{B_c-1}$ samples of the a-th symbol is interfered by the tail of the (a−1)-th symbol $[\theta_{a-1}^{u_c}(n)]_{n=0}^{d_{Path-1}B_c-1}-1$. It can be eliminated by subtracting the interference from the a-th symbol. Therefore, the process of inter-symbol interference cancellation can be described as follows.

When detecting the a-th OFDM symbol, the detection of the (a−1)-th OFDM symbol has been completed, and the information of the (a−1)-th OFDM symbol $[S_{a-1}^{u_c}(n)]_{n=0}^{M+L_{Path-1}-1}$ is known to the receiving UE. Make the (a−1)-th transmitted symbol convolve with the channel vector. Thus, the (a−1)-th received OFDM symbol is defined as $$[y_{a-1}^{u_c}(n)]_{n=0}^{M+L_{Path-1}+d_{Path-1}B_c-1}-1 = [s_{a-1}^{u_c}(n)]_{n=0}^{M+L_{Path-1}-1} * [\hat{g}^{u_c}(n)]_{n=0}^{d_{Path-1}B_c-1},$$

the last $d_{Path-1}^{B_c-1}$ elements obtained is the tail of the (a−1)-th symbol. It can be expressed as $$\theta_{a-1}^{u_c} = [\theta_{a-1}^{u_c}(n)]_{n=0}^{d_{Path-1}^{B_c-1}-1} = [y_{a-1}^{u_c}(n)]_{n=M+L_{Path-1}}^{M+L_{Path-1}+d_c-1}$$

After subtracting the interference from the a-th symbol, the $(M+L_{Path-1})$ point sampling of a-th OFDM symbol is $$y_a^{u_c} = [y_a^{u_c}(n)]_{n=0}^{M+L_{Path-1}-1} =$$

$$\hat{y}_a^{u_c} - \theta_{a-1}^{u_c} = \left[\sum_{d=0}^{d_{Path-1}^{B_c-1}-1} \hat{g}_d^{u_c} s_a^{u_c}(n-d) + z_a^{u_c}(n)\right]_{n=0}^{M+L_{Path-1}-1}$$

In the first stage, the tail interference from the (a−1)-th symbol is subtracted, leaving a gap in the current symbol. Thus, the $(M+L_{Path-1})$ elements of the current received signal can be obtained as $$[y_a^{u_c}(n)]_{n=0}^{M+L_{Path-1}-1} = \left[\sum_{d=0}^{n} y_{a,d}^{u_c}(n-d)\right]_{n=0}^{M+L_{Path-1}-1}$$

This gap will cause inter-carrier interference, so further signal processing is required. The main idea is to use the signal of the a-th symbol in the tail zone of the third stage to compensate the gap mentioned above. The tail of a signal is denoted as $$[\theta_a^{u_c}(n)]_{n=0}^{d_{Path-1}^{B_c-1}-1} = \left[\sum_{d=n+1}^{d_{Path-1}^{B_c-1}} y_{a,d}^{u_c}(M+L_{Path-1}-d)\right]_{n=0}^{d_{Path-1}^{B_c-1}-1}$$

Disregarding the noise item, the first sample is $y_a^{u_c}(0) = \hat{g}_0^{u_c} s_a^{u_c}(0)$. The first sample of transmission signal of each BS is estimated as $$[y_{a,d}^{u_c}(0)]_{d=0}^{d_{Path-1}^{B_c-1}} = y_a^{u_c}(0) \frac{\hat{g}}{\hat{g}_0^{u_c}}$$

After obtaining the second sample $y_{a,0}^{u_c}(1)$, the difference between $y_{a,1}^{u_c}(0)$ and $y_a^{u_c}(1)$ may be calculated as $y_{a,0}^{u_c}(1) = y_a^{u_c}(1) - y_{a,1}^{u_c}(9)$, and the second samples of transmission signals of all of BSs are obtained as $$[y_{a,d}^{u_c}(1)]_{d=0}^{d_{Path-1}^{B_c-1}} = y_a^{u_c}(1) \frac{\hat{g}}{\hat{g}_0^{u_c}}$$

Signals are processed similarly. After the last sample $y_a^{u_c}(M+L_{Path-1}-1)$ is obtained using the above method, the difference between $\Sigma_{d-1}^{d_{Path-1}^{B_c-1}} y_{a,d}^{u_c}(M+L_{Path-1}-d-1)$ and $y_a^{u_c}(M+L_{Path-1}-1)$ is obtained as $$y_{a,0}^{u_c}(M+L_{Path-1}-1) = y_a^{u_c}(M+L_{Path-1}-1) - \Sigma_{d=1}^{d_{Path-1}^{B_c-1}} y_{a,d}^{u_c}(M+L_{Path-1}-d-1),$$

and the $(M+L_{Path-1})$-th samples of transmission signals of all of BSs are obtained as $$[y_{a,d}^{u_c}(M+L_{Path-1}-1)]_{d=0}^{d_{Path-1}^{B_c-1}} = y_{a,0}^{u_c}(M+L_{Path-1}-1) \frac{\hat{g}}{\hat{g}_0^{u_c}}$$

The samples used in each step have been estimated using previous samples. The tail signal is calculated as $[\Sigma_{d=n+1}^{d_{Path-1}^{B_c-1}} y_{a,d}^{u_c}(M+L_{Path-1}-d)]_{n=0}^{d_{Path-1}^{B_c-1}-1}$. And the CP signal for the a-th symbol is obtained as $[y_{a,o}^{u_c}(n)]_{n=0}^{L_{Path-1}} - d)](_{n=0}^{L_{Path-1}-1}$. For the interval $[y_a^{u_c}(n)]_{n=L_{Path-1}}^{M+L_{Path-1}-1}$ to be demodulated, it needs to be compensated after removing the CP signal, so that the demodulated signal is cyclically shifted. Then all the CP signals of the a-th symbol are received as $[y_{a,cp_B}^{u_c}(n)]_{n=0}^{d_{Path_c}^{B_c-1}+L_{Path-1}-1} = [y_{a,0}^{u_c}(n)]_{n=0}^{L_{Path-1}-1} * [g\hat{g}^{u_c}(n)]_{n=0}^{d_{Path-1}^{B_c}}$ After processing the tail interference of the (a−1)-th symbol, the $(M+L_{Path-1})$ sampled signal of the a-th received symbol subtracts the signal of the CP part of the corresponding interval. And the $(M+L_{Path-1})$ sampled signal of the a-th received symbol is obtained as $$[\tilde{y}_a^{u_c}(n)]_{n=0}^{M-1} = [y_a^{u_c}(n)]_{n=0}^{M+L_{Path-1}-1} - [y_{a,cp}^{u_c}(n)]_{n=0}^{M+L_{Path-1}-1} =$$

$$\left[\sum_{d=0}^{n-L_{Path-1}} y_{a,d}^{u_c}(n-d)\right]_{n=L_{Path-1}}^{M+L_{Path-1}-1}$$

The corresponding tail signal is added to the samples in the demodulation zone. After compensating the asynchronization gap, the inter-carrier interference is eliminated, so that the correct symbol can be demodulated. And the received a-th OFDM symbol is $$[\tilde{y}_a^{u_c}(n)]_{n=0}^{M-1} =$$

$$\left[\sum_{d=0}^{n-L_{Path-1}} y_{a,d}^{u_c}(n-d)\right]_{n=L_{Path-1}}^{M+L_{Path-1}-1} + \left[\sum_{d=n+1}^{d_{Path-1}^{B_c-1}} y_{a,d}^{u_c}(M+L_{Path-1}-d)\right]_{n=0}^{M-1} =$$

$$[\tilde{y}_a^{u_c}(n)]_{n=0}^{M-1} + \left[\sum_{d=n+1}^{d_{Path-1}^{B_c-1}} y_{a,d}^{u_c}(M+L_{Path-1}-d)\right]_{n=0}^{M-1}$$

In an embodiment, the procedure in block S15 may be carried out as follows. The energy efficiency of each non-overlapping clustering scheme is calculated and analyzed based on the joint transmission signals of each cooperative cluster are synchronized, and the sub-clustering scheme with the greatest energy efficiency is selected as the final sub-clustering scheme.

The received signal and capacity of a UE served by a macro BS and those of a UE served by a micro BS of a cooperative cluster after joint transmissions are synchronized can be analyzed as follows.

M modulation symbols are included in one OFDM symbol and each modulation symbol needs a corresponding subcarrier modulation. Let $\tilde{g}$ be the channel frequency response of each subcarrier, and it is given by $$\tilde{g} = \left[\sum_{b_c=0}^{B_c-1} \tilde{g}^{b_c,u_c}(n)\right]_{n=0}^{M+L_{Path}-1} =$$

$$\left[\sum_{b_c=0}^{B_c-1}\sum_{path=0}^{Path-1} g_{path}^{b_c,u_c} e^{-j2\pi\left(\frac{nd_{path}^{b_c}}{M+L_{Path}-1}-\phi_{path}\right)}\right]_{n=0}^{M+L_{Path}-1}$$

Based on the received signal of UE $u_c$ after the joint transmissions are synchronized at UE $u_c$, the capacity $R_{u_c}$ of UE $u_c$ in the cooperative cluster is $$R_{u_c} = \sum_{m=0}^{M+L_{Path}-1} \frac{w_{u_c}}{M+L_{Path}-1}\log_2\left(1 + \frac{\sum_{b_c=0}^{B_c-1}\|\tilde{g}^{b_c,u_c}(m)v^{b_c,u_c}\|^2 P_{b_c,u_c}^m}{\sum_{e=1,e\neq c}^{C}\sum_{b_e=0}^{B_e-1}\sum_{l=1}^{U_e}\|\tilde{g}^{b_e,u_c}(m)v^{b_e,l_e}\|^2 P_{b_e,l_e}^m + \sigma_{u_c}^2}\right)$$

where $w_{u_c}$ denotes the bandwidth allocated by a micro BS of the cooperative cluster to UE u c served by the micro BS; $P_{b_c,u_c}$ is the power allocated to UE $u_c$ above m-th subcarrier by b-th micro BS in cluster c; $P_{b_e,l_e}$ is the power allocated to UE $l_e$ above m-th subcarrier by b-th micro BS in cluster e.

The received signal of UE o served by a macro BS is:

$$y^o = g^{r,o}s^{r,o} + \sum_{x\in B_{Macro},x\neq r} g^{x,o}s^{x,o} + z_o$$

where $g^{r,o}$ represents the overall channel coefficient between macro BS r and UE o served by macro BS r; $s^{r,o}$ represents the product of normalized data symbol $x_{r,o}$ and a power allocation weight $p_{r,o}$; $s^{x,o}$ denotes the signal transmitted by a macro BS x other than macro BS r to UE o; $g^{x,o}$ denotes the overall channel coefficient between UE o and macro BS x other than macro BS r; $z_{o\neq CN}(0,\sigma_o^2)$ denotes white Gaussian noise with a mean of 0 and a variance of $\sigma_o^2$.

The capacity $R_o$ of UE o served by macro BS is:

$$R_o = \sum_{m=0}^{M+L_{Path}-1} \frac{w_o}{M+L_{Path}-1}\log_2\left(1 + \frac{\|g^{r,o}(m)\|^2 P_{r,o}^m}{\sum_{x\in B_{Macro},x\neq r}\|g^{x,o}(m)\|^2 P_{x,o}^m + \sigma_o^2}\right)$$

where $w_o$ denotes the bandwidth allocated by a macro BS to UE o served by the macro BS; $P_{r,o}^m$ is the power allocated to UE o above m-th subcarrier by a macro BS r; $P_{x,o}^m$ is the power allocated to UE o above m-th subcarrier by a macro BS x. Therefore, the total system capacity of the heterogeneous network can be obtained as:

$$R_{sum} = \sum_{o\in U_{Macro}} R_o + \sum_{c=1}^{C}\sum_{u_c\in U_{Micro}} R_{u_c}.$$

The power consumption of each macro BS and the power consumption of each micro BS in the cooperative cluster may be analyzed as follows.

The power consumption of macro BS r is:

$$P_{sum}^r = P_{tx}^r + P_{sp}^r + P_{const}^r$$

where $P_{tx}^r$ denotes the transmitting power of macro BS r, $P_{sp}^r$ denotes the power consumption for signal processing of macro BS r, and $P_{const}^r$ denotes the power consumption of fixed hardware circuits of macro BS r.

The total power consumption $P_{sum}^{c_c}$ of micro BS b in cooperative cluster c is:

$$P_{sum}^{b_c} = \xi_1 \cdot P_{tx}^{b_c} + \xi_2 \cdot P_{sp}^{b_c} + P_{const}^{b_c}$$

where $P_{tx}^{b_c}$ denotes the transmitting power of micro BS b, $P_{sp}^{b_c}$ denotes the power consumption for cooperative signal processing by micro BS b, $P_{bh}^{b_c}$ denotes the power consumption for backhaul of micro BS b, and $P_{const}^{b_c}$ denotes the power consumption of other fixed hardware circuits of micro BS b, coefficients $\xi_1, \xi_2, \xi_3$ respectively denotes the proportion of corresponding power consumption to the overall power consumption of the BS.

The power consumption for signal processing is:

$$P_{sp}^{b_c} = p_{sp}^{b_c}(0.87 + 0.1B_c + 0.03B_c^2)$$

in which $B_c$ denotes the number of micro BSs in cooperative cluster c, $p_{sp}^{b_c}$ is the power consumption for signal processing by a BS without multiple-BS cooperation, and the power consumption for backhaul brought by multiple-BS cooperation is modeled as the function of the backhaul data rate $R_{bh}^{b_c}$.

The backhaul power consumption $R_{bh}^{b_c}$ is:

$$P_{bh}^{b_c} = \frac{R_{bh}^{b_c}}{2\times 10^6}$$

where $R_{bh}^{b_c}$ denotes the backhaul data rate.

The total power consumption of the heterogeneous network is $P_{sum} = \sum_{r\in B_{Macro}} P_{sum}^r + \sum_{c=1}^{C}\sum_{b_c\in B_{Micro}} P_{sum}^{b_c}$. Therefore, the total energy efficiency of the base stations can be obtained as $$\eta_{EE} = \frac{R_{sum}}{P_{sum}}.$$

In order to obtain the non-overlapping clustering scheme with the maximum energy efficiency, the cooperative transmission state matrix Q satisfies:

$Q = \text{argmax} \eta_{EE}$ s.t.

C1: $q_{i,j}^{(n)} = 0, 1$

-continued $$C2: 1 \le \sum_{j=1}^{|B_{Micro}|} q_{i,j}^{(n)} \le |B_{Micro}|, \exists\, q_{i,|B_{Micro}|+1}^{n} = 1$$

$$C3: \sum_{i=1}^{|U|} \left| q_{i,j}^{(n)} v_{i,j} s_i q_{i,|B_{Micro}|+1}^{(n)} \right|^2 \le P_{max}, \exists\, 1 \le j \le |B_{Micro}|$$

where C1 denotes that the elements of the cooperative transmission state matrix are restricted to be 0 or 1; C2 denotes the limit on the number of clusters; C3 denotes the limit of the transmitting power of each micro BS, i.e., the transmitting power of each micro BS should not exceed the maximum transmitting power $P_{max}$. The cooperative BS cluster with the maximum energy efficiency can be obtained by traversing all non-overlapping clustering schemes.

In an embodiment, the load information of all of BSs in the entire network is obtained. The BS load change threshold is configured. The set of sub-clusters are kept unchanged until the load information satisfies the requirements of the BS load change threshold, and then re-clustering is carried out.

According to various embodiments, clustering of a densely deployed heterogeneous network is carried out with energy efficiency as the main concern. The division of cooperative cells is obtained according to the degree of interference suffered by UEs, with the power consumption of the BSs during the cooperation process also considered, which means that the clustering process focuses not only on the BSs or UEs, but also focuses on the system energy efficiency of the overall heterogeneous network.

Pre-clustering is performed, e.g., using the k-means clustering algorithm, and candidate cooperative BS sets are determined according to the difference between RSRP and a determined threshold. The non-overlapping cooperative sub-clusters with the greatest energy efficiency is constructed through sub-clustering based on the maximum independent sets of graph. The UE association scheme is used to adjust the number of UEs accessing macro BSs and the number of UEs accessing micro BS clusters in the heterogeneous network, and the clusters are adjusted according to the load change. It is an efficient semi-dynamic clustering scheme.

The interference caused by the asynchrony in the joint transmission process is addressed by generating and compensating the asynchronization gap of the transmission symbol. The synchronization process is performed at the UEs, which avoids the signaling overhead for synchronizing cooperative transmission of the BSs and meanwhile improves the quality of the communication link.

The present application is not limited by the above-mentioned embodiments. What is described in the above-mentioned embodiments and the description is only to illustrate the principle of the present application. Without departing from the spirit and scope of the present application, the present application will also have various changes and improvements. These changes and modifications are within the scope of the claimed invention. The claimed scope of the invention is defined by the appended claims.

What is claimed is:

1. A method of establishing a wireless communication network, comprising:
in a network comprising a plurality of macro base stations, a plurality of micro base stations and a plurality of user devices (UEs);
assigning, by a network device, the micro base stations into a plurality of clusters and selecting a micro base station from each of the clusters as a cluster head;
receiving, from cluster heads of the clusters by the network device, information about candidate sub-clusters determined by UEs, each of the candidate sub-clusters comprises micro base stations whose signal power received at a UE exceeds a pre-defined threshold;
identifying, by the network device, at least two schemes of grouping the micro base stations into non-overlapping sub-clusters based on the candidate sub-clusters, each micro base station belongs to not more than one of the non-overlapping sub-clusters in each of the at least two schemes;
for a scheme of the at least two schemes,
making, by the network device, each of the UEs select to access a macro base station or to be associated with one of the non-overlapping sub-clusters of the scheme base on respective measurements of signals received from at least one of a macro base station and a sub-cluster of the non-overlapping sub-clusters of the scheme;
suppressing, by a UE, inter-symbol interference by subtracting a tail of a first symbol from a second symbol before recovering the second symbol, the first symbol is received from a sub-cluster performing joint transmission, the second symbol is received following the first symbol from the sub-cluster;
suppressing, by the UE, inter-carrier interference by adding a tail estimated of the second symbol to the second symbol before recovering the second symbol;
acquiring, by the network device, information about power consumption of each of the macro base stations and power consumption of each of the micro base stations in communications with the UEs which performs inter-symbol interference suppression and inter-carrier interference suppression at the UEs; and
making, by the network device, the micro base stations perform joint transmissions in sub-clusters as specified in a scheme selected from the at least two schemes according to the information about power consumption.

2. The method of claim 1, wherein assigning by a network device the micro base stations into a plurality of clusters comprising:
assigning the micro base stations into a pre-defined number of clusters which include similar number of micro base stations.

3. The method of claim 1, wherein selecting a micro base station from each of the clusters as a cluster head comprising:
selecting, from a cluster, a micro base station with the lightest load in the cluster as the cluster head.

4. The method of claim 1, wherein identifying by the network device at least two schemes of grouping the micro base stations into non-overlapping sub-clusters based on the candidate sub-clusters comprising:
grouping micro base stations of a cluster into non-overlapping sub-clusters based on candidate sub-clusters which comprise micro base stations of the cluster.

5. The method of claim 1, wherein identifying by the network device at least two schemes of grouping the micro base stations into non-overlapping sub-clusters based on the candidate sub-clusters comprising:
acquiring at least two maximum independent sets of a graph as the at least two schemes with each candidate sub-cluster being a vertex of the graph, an edge between two vertices of the graph indicates two candidate sub-clusters corresponding to the two vertices have a common micro base station.

6. The method of claim 1, further comprising:
obtaining, by the network device, system capacity and total power consumption of all of the macro base stations and the micro base stations under each of the at least two schemes;
selecting, by the network device, a scheme which has the largest ratio of system capacity to total power consumption in the at least two schemes as the scheme selected from the at least two schemes.

7. The method of claim 1, further comprising:
obtaining, by the network device, information about load of all of the macro base stations and the micro base stations;
when changes in the load of all of the macro base stations and the micro base stations satisfy a pre-determined condition, performing, by the network device, the identifying procedure and the making procedure to update the scheme selected.

8. The method of claim 1, further comprising:
estimating, by the UE, a time difference between transmission signals from two micro base stations performing joint transmission of a sub-cluster using cell-specific reference signals (CRS) of the two micro base stations, the transmission signals comprise no cyclic prefix;
recovering, by the UE, the second symbol from the transmission signals using the time difference.

9. The method of claim 1, further comprising:
processing, by the UE using an equalization filter before recovering the second symbol, the second symbol to which the tail estimated of the second symbol has been added.

10. A network device in a network comprising a plurality of macro base stations, a plurality of micro base stations and a plurality of user devices (UEs), comprising:
a processor; and
a memory storing machine-readable instructions executable by the processor to:
assign the micro base stations into a plurality of clusters and selecting a micro base station from each of the clusters as a cluster head;
receive, from cluster heads of the clusters, information about candidate sub-clusters determined by UEs, each of the candidate sub-clusters comprises micro base stations whose signal power received at a UE exceeds a pre-defined threshold;
identify at least two schemes of grouping micro base stations into non-overlapping sub-clusters based on the candidate sub-clusters, each micro base station belongs to not more than one of the non-overlapping sub-clusters in each of the at least two schemes;
for a scheme of the at least two schemes,
make each of the UEs select to access a macro base station or to be associated with one of the non-overlapping sub-clusters of the scheme base on respective measurements of signals received from at least one of a macro base station and at least one sub-cluster of the non-overlapping sub-clusters of the scheme;
acquire information about power consumption of each of the macro base stations and power consumption of each of the micro base stations in communications with the UEs which performs inter-symbol interference suppression and inter-carrier interference suppression at the UEs;
make the micro base stations perform joint transmissions in sub-clusters as specified in a scheme selected from the at least two schemes according to the information about power consumption.

11. The network device of claim 10, wherein the instructions are executable by the processor to:
assign the micro base stations into a pre-defined number of clusters which include similar number of micro base stations.

12. The network device of claim 10, wherein the instructions are executable by the processor to:
select from a cluster a micro base station with the lightest load in the cluster as the cluster head.

13. The network device of claim 10, wherein the instructions are executable by the processor to:
group micro base stations of a cluster into non-overlapping sub-clusters based on candidate sub-clusters which comprise micro base stations of the cluster.

14. The network device of claim 10, wherein the instructions are executable by the processor to:
acquire at least two maximum independent sets of a graph as the at least two schemes with each candidate sub-cluster being a vertex of the graph, an edge between two vertices of the graph indicates two candidate sub-clusters corresponding to the two nodes have a common micro base station.

15. The network device of claim 10, wherein the instructions are executable by the processor to:
obtain system capacity and total power consumption of all of the macro base stations and the micro base stations under each of the at least two schemes;
select a scheme which has the largest ratio of system capacity to total power consumption in the at least two schemes as the scheme selected from the at least two schemes.

16. The network device of claim 10, wherein the instructions are executable by the processor to:
obtain information about load of all of the macro base stations and the micro base stations;
when changes in the load of all of the macro base stations and the micro base stations satisfy a pre-determined condition, perform the identifying procedure and the making procedure to update the scheme selected.

17. A user device (UE) in a network comprising a plurality of macro base stations, a plurality of micro base stations and a plurality of user devices, comprising:
a processor; and
a memory storing machine-readable instructions executable by the processor to:
obtain first measurements of signals received from at least one of a macro base station and at least one micro base station;
determine, using the first measurements, a candidate sub-cluster which comprises micro base stations whose signal power received by the UE exceeds a pre-defined threshold;
sending information about the candidate sub-cluster to a serving base station;
obtaining second measurements of signals received from at least one of a macro base station and at least one sub-cluster;
selecting, using the second measurements, to access a macro base station or to be associated a sub-cluster;
suppressing inter-symbol interference of joint transmission of a sub-cluster by subtracting a tail of a first symbol of the joint transmission from a second symbol received following the first symbol before recovering the second symbol;

suppressing inter-carrier interference by adding a tail estimated of the second symbol to the second symbol before recovering the second symbol.

18. The UE of claim 17, wherein the instructions are executable by the processor to:

estimate a time difference between transmission signals from two micro base stations performing joint transmission of a sub-cluster using cell-specific reference signals of the two micro base stations, the transmission signals comprise no cyclic prefix;

recover the second symbol from the transmission signals using the time difference.

19. The UE of claim 17, wherein the instructions are executable by the processor to:

process, using an equalization filter before recovering the second symbol, the second symbol to which the tail estimated of the second symbol has been added.

20. The UE of claim 17, wherein the instructions are executable by the processor to:

select to access a macro base station or to be associated with a sub-cluster base on measurements of signals received from at least one of a macro base station and at least one sub-cluster.

* * * * *